US008243397B2

(12) United States Patent
Messner et al.

(10) Patent No.: US 8,243,397 B2
(45) Date of Patent: Aug. 14, 2012

(54) MICROMACHINED ELECTROTHERMAL ROTARY ACTUATOR

(75) Inventors: William C. Messner, Pittsburgh, PA (US); James A. Bain, Pittsburgh, PA (US); Gary K. Fedder, Turtle Creek, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1370 days.

(21) Appl. No.: 11/820,628

(22) Filed: Jun. 20, 2007

(65) Prior Publication Data
US 2008/0314040 A1    Dec. 25, 2008

(51) Int. Cl.
*G11B 5/56*    (2006.01)
(52) U.S. Cl. .................................... 360/294.3
(58) Field of Classification Search ............... 360/294.3; 310/306; 60/528
See application file for complete search history.

(56) References Cited

U.S. PATENT DOCUMENTS

| | | | | |
|---|---|---|---|---|
| 5,153,870 | A | | 10/1992 | Lee et al. |
| 6,137,206 | A | * | 10/2000 | Hill ............................. 310/306 |
| 6,275,325 | B1 | * | 8/2001 | Sinclair ........................ 359/291 |
| 6,313,562 | B1 | * | 11/2001 | Barnes et al. ................. 310/306 |
| 6,364,461 | B2 | * | 4/2002 | Silverbrook .................. 347/54 |
| 6,439,694 | B1 | * | 8/2002 | Silverbrook .................. 347/54 |
| 6,493,171 | B2 | | 12/2002 | Enokida et al. |
| 6,590,313 | B2 | * | 7/2003 | Agrawal et al. ............... 310/307 |
| 6,655,002 | B1 | * | 12/2003 | Maimone et al. .............. 29/596 |
| 6,745,567 | B1 | * | 6/2004 | Mercanzini ................... 60/527 |
| 6,757,140 | B1 | * | 6/2004 | Hawwa ...................... 360/294.5 |
| 6,963,462 | B2 | | 11/2005 | Satoh |
| 7,026,184 | B2 | | 4/2006 | Xie et al. |
| 7,800,865 | B2 | * | 9/2010 | White et al. ................. 360/265.7 |
| 7,835,110 | B2 | * | 11/2010 | Johnston et al. ............. 360/97.12 |
| 2002/0032828 | A1 | | 3/2002 | Hoskins |
| 2007/0103029 | A1 | | 5/2007 | Fedder et al. |

OTHER PUBLICATIONS

Kurita, et al., Nanometer Scale Actuation of Magnetic Head Elements In Hard Disk Drives With Built-In Microheater, IEEE, Jan. 2006, p. 818-821.
Yang, et al., An Electro-Thermal Bimorph-Based Microactuator For Precise Track-Positioning Of Optical Disk Drives, Journal of Micromechanics and Microengineering, 2005, p. 958-965.

* cited by examiner

*Primary Examiner* — Angel A. Castro
(74) *Attorney, Agent, or Firm* — Jones Day

(57) ABSTRACT

The present disclosure is directed to a micromachined rotary actuator constructed of a central portion and an outer portion at least partially surrounding the central portion and separated from the central portion by an in-plane gap. A plurality of arms are each connected at one end to the central portion and at another end to the outer portion so as to span the in-plane gap. The arms are constructed of a plurality of horizontally stacked materials positioned to enable the arms to bend in-plane when heated. Conductors are positioned within the actuator for heating the arms. Because of the rules governing abstracts, this abstract should not be used to construe the claims.

26 Claims, 16 Drawing Sheets

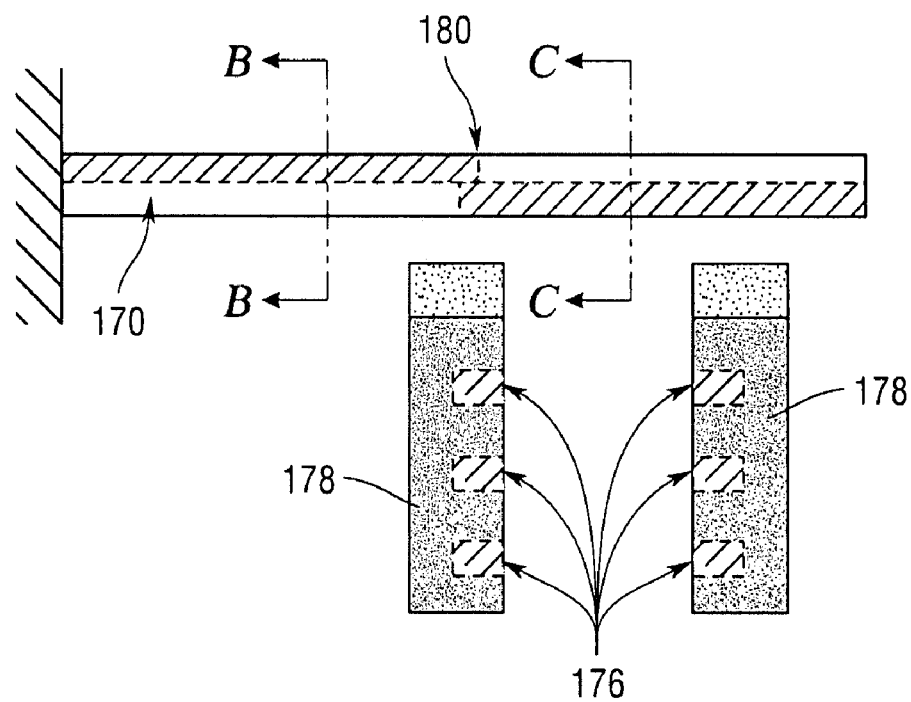
*Fig.8A*  *Fig.8B*  *Fig.8C*
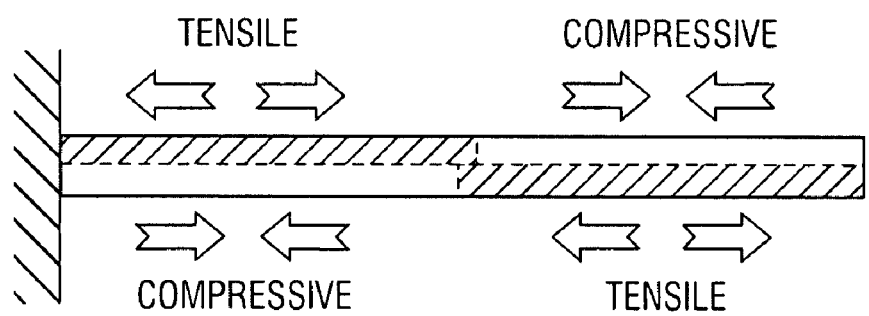
*Fig.9A*
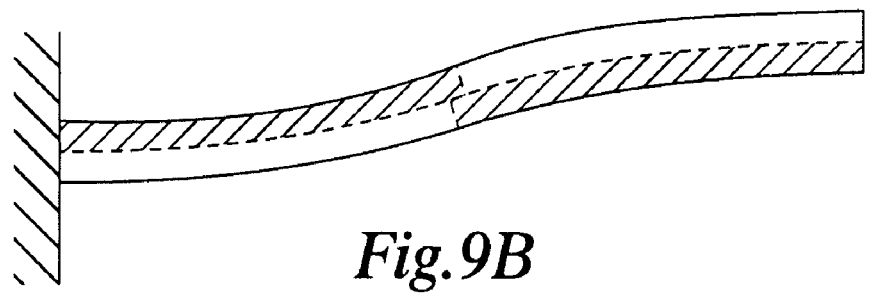
*Fig.9B*

| TYPICAL STIFFNESS | | | | |
|---|---|---|---|---|
| DISPLACEMENT MODE | PER BEAM | NUMBER OF CONTRIBUTING BEAMS | TOTAL | COMMENT |
| TORSIONAL | 3 N/m | 100 | 3000 N/m | ALLOWS +/-2 DEGREES AT $\Delta T$ = 140K |
| LATERAL | 5000 N/m | 20 | 100,000 N/m | ONLY 20 BEAMS CONTRIBUTE RESONANT FREQ = 118 KhZ DISP AT 300g = 0.21 $\mu$m |
| AXIAL | 20 N/m | 100 | 2000 N/m | 5 $\mu$m PER GRAM OF AXIAL LOAD |

ASSUMPTIONS

| D1 | 100 | $\mu$m |
|---|---|---|
| D2 | 380 | $\mu$m |
| L | 140 | $\mu$m |
| W | 2.4 | $\mu$m |
| t | 7 | $\mu$m |

| TORSIONAL DISPLACEMENT | SINGLE BEAM STIFFNESS | AGGREGATE STIFFNESS (20 BEAMS) | L | RESONANT FREQ | SHOCK DISPLACEMENT |
| --- | --- | --- | --- | --- | --- |
| +/- DEGREES | N/m | N/m | (μm) | (kHz) | (μm) |
| 1 | 10000 | 200000 | 100 | 141 | 0.15 |
| 2 | 7000 | 140000 | 140 | 118 | 0.21 |
| 3 | 6000 | 120000 | 170 | 110 | 0.25 |
| 4 | 5200 | 104000 | 197 | 102 | 0.28 |
| 5 | 4600 | 92000 | 220 | 96 | 0.32 |

FOR MASS = mg; SHOCK = 300g

| TORSIONAL DISPLACEMENT | AXIAL STIFFNESS | AXIAL DEFLECTION (1 g LOAD) | L |
|---|---|---|---|
| +/- DEGREES | N/m | (μm) | (μm) |
| 1 | 5800 | 1.7 | 100 |
| 2 | 2329 | 4.2 | 140 |
| 3 | 1370 | 7.2 | 170 |
| 4 | 941 | 10.4 | 197 |
| 5 | 704 | 13.9 | 220 |

MICROMACHINED ELECTROTHERMAL ROTARY ACTUATOR

BACKGROUND

The present disclosure is directed generally to micromachined devices, and in a particular embodiment, to a micromachined rotary actuator capable of being used to precisely position a transducer head within a disk drive.

Various micro-actuation techniques such as electrostatic, thermal, piezoelectric, or magnetic have been demonstrated. Some of the early electrothermal actuator designs are based on the bimorph effect, which relies on the difference of thermal expansion coefficients between two adjacent layers on the device. By heating these layers, a bending moment is created. However such actuators typically produce deflection in the direction normal to the substrate.

U.S. Patent Publication No. 2007/0103029 entitled Self-Assembling MEMS Devices Having Thermal Actuation is directed to a method for designing MEMS micro-movers, particularly suited for, but not limited to, CMOS fabrication techniques, that are capable of large lateral displacement for tuning capacitors, fabricating capacitors, self-assembly of small gaps in CMOS processes, fabricating latching structures, and other applications where lateral micro-positioning on the order of up to 10 µm, or greater, is desired. In self-assembly, motion is induced in specific beams by designing a lateral effective residual stress gradient within the beams. The lateral residual stress gradient arises from purposefully offsetting certain layers of one material versus another material. For example, lower metal layers may be side by side with dielectric layers, both of which are positioned beneath a top metal layer of a CMOS-MEMS beam. In electro-thermal actuation, motion is induced in specific beams by designing a lateral gradient of temperature coefficient of expansion (TCE) within the beams. The lateral TCE gradient is achieved in the same manner as with self-assembly, by purposefully offsetting the lower metal layers with layers of dielectric with respect to the top metal layer of a CMOS-MEMS beam. A heater resistor, usually made from a CMOS polysilicon layer, is embedded into the beam or into an adjacent assembly to heat the beam. When heated, the TCE gradient will cause a stress gradient in the beam, resulting in the electro-thermal actuation.

Turning now to a specific application, the servo system of a disk drive has two primary operations, namely track seek and track follow. Track seek is the operation of moving the head (containing the read transducer and the write transducer) from one data track to another, during which the voice coil motor (VCM) actuator may rotate through its full stroke of 20 to 30 degrees, if one track is at the inner diameter and the other track is at the outer diameter of the disk. After the completion of a track seek, the track follow operation maintains the read or write transducer close to the center of the data track. Challenges to keeping the transducer at the data track center include repeatable and non-repeatable runout of the data track, shock and vibration disturbances, windage disturbances (aerodynamic drag forces arising from laminar and turbulent air flow), and noise in the feedback measurements and electronics.

Head skew is the phenomenon where the longitudinal axis of a read/write head on a disk drive and the tangent of the data track, which the head is reading or writing, are not parallel. That is, the angle between the data track and the head axis is not zero. Head skew degrades the performance of recording in disk drives and is particularly troublesome for disk drives employing perpendicular recording technology, where long narrow poles are desired but cannot be used because they write tracks that are too wide when skewed. Due to curvature of the track the magnitude of the skew is generally less than one-half of the full stroke of the VCM, but can be on the order of 10 degrees.

FIG. 1 illustrates how head skew can be undesirable, particularly in perpendicular recording where head skew results in a wider track width than if the skew were always zero. Shown in FIG. 1A is the position of the head as it would occur at the inner diameter (ID) of the track. Shown in FIG. 1B is the position of the head as it would occur at the middle diameter (MD) of the track and in FIG. 1C as it would occur in the outer diameter (OD) of the track. The need exists for a method and apparatus for eliminating or reducing head skew in disk drives.

SUMMARY

The present disclosure is directed to a micromachined rotary actuator comprising a central portion and an outer portion at least partially surrounding the central portion and separated from the central portion by an in-plane gap. A plurality of arms are each connected at one end to the central portion and at another end to the outer portion so as to span the in-plane gap. The arms are comprised of a plurality of horizontally stacked materials positioned to enable the arms to bend in-plane when heated. Conductors are positioned within the actuator for heating the arms.

The disclosed micromachined rotary actuator is suitable for rotating the head assembly of a hard drive about an axis parallel to the axis of the VCM to compensate for head skew. Both skew compensation and high bandwidth control of the position of a hard disk head assemble can be achieved. The stroke of the actuator in one embodiment is on the order of ±1 to 5 degrees, enough to compensate for the head to track skew in a disk drive. In its high bandwidth mode, the stroke is on the order of 100 nanometers operating at a bandwidth of several kilohertz. Those, and other advantages and benefits will become apparent from the description below.

BRIEF DESCRIPTION OF THE DRAWINGS

For the present disclosure to be easily understood and readily practiced, the present invention will now be described, for purposes of illustration and not limitation, in connection with the following figures, wherein:

FIG. 8A is a plan view looking down on an arm of one embodiment of an actuator constructed according to the teachings of the present disclosure, FIG. 8B is a sectional view taken along the line B-B in FIG. 8A, and FIG. 8C is a sectional view taken along the line C-C in FIG. 8A;

FIG. 9A is a plan view looking down on one embodiment of an arm of an actuator constructed according to the teachings of the present disclosure before release and illustrating the forces within the arm, FIG. 9B illustrates the same arm after release;

DETAILED DESCRIPTION

Figures 1A, 1B, 1C:
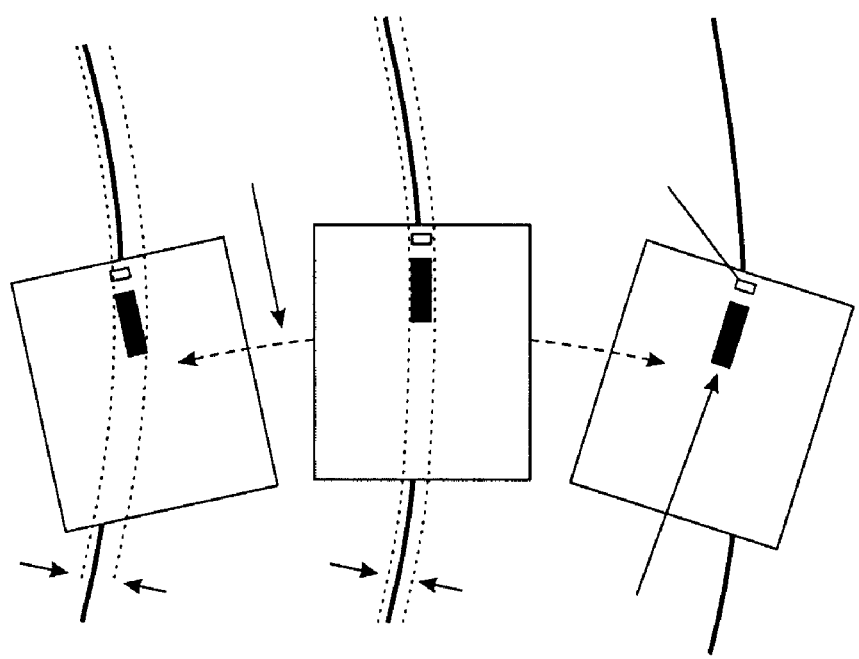
FIGS. 1A, 1B, and 1C illustrate how head skew can be undesirable, particularly in perpendicular recording where head skew results in a wider track width than if the skew were always zero.
Figure 2:
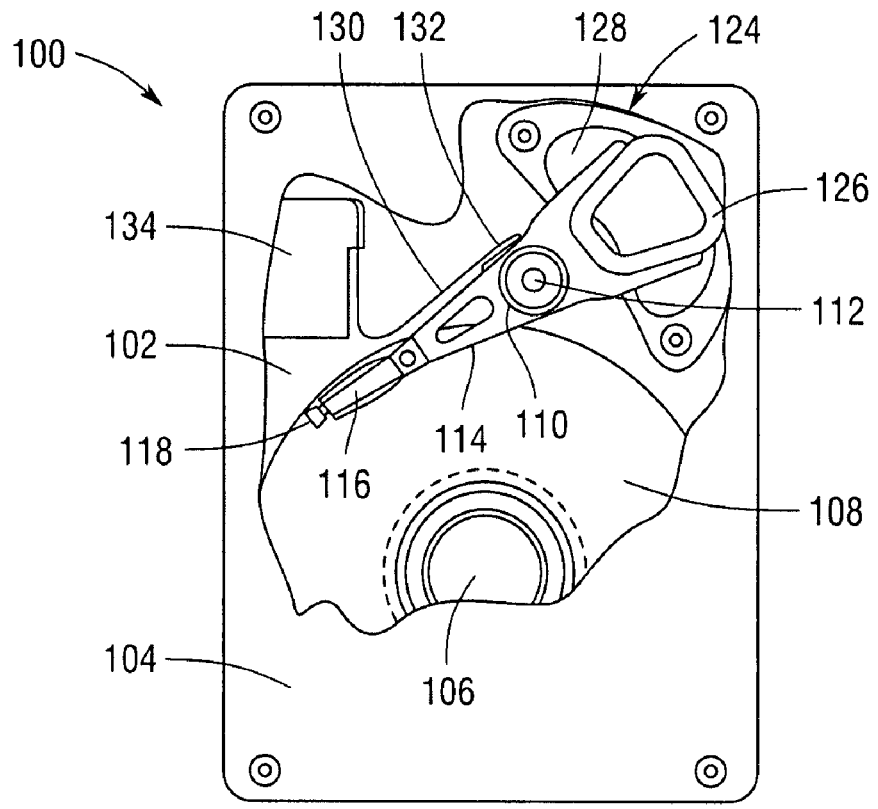
FIG. 2 is a plan view of the primary internal components of a disk drive of the type in which the present invention may be employed.

In FIG. 2, a disk drive 100 is illustrated as one example of the type of disk drive in which an electrothermal actuator for compensating for head skew disclosed herein may be used. The disk drive 100 includes a base 102 to which various components of the disk drive 100 are mounted. A top cover 104, shown partially cut away, cooperates with the base 102 to form an internal, sealed environment for the disk drive 100 in a conventional manner. The components include a spindle motor 106 which rotates one or more disks 108 at a constant high speed. Information is written to and read from tracks on the disks 108 through the use of an actuator assembly 110, which rotates during a seek operation about a bearing shaft assembly 112 positioned adjacent the disks 108. The actuator assembly 110 includes a plurality of actuator arms 114 which extend towards the disks 108, with one or more flexures 116 extending from each of the actuator arms 114. Mounted at the distal end of each of the flexures 116 is a transducer head 118 which includes an air bearing slider 117 enabling the head 118 to "fly" in close proximity above the corresponding surface of the associated disk 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the disks 108. The spindle motor 106 is typically de-energized when the disc drive 100 is not in use for extended periods of time.

A flex assembly 130 provides the requisite electrical connection paths for the actuator assembly 110 while allowing pivotal movement of the actuator assembly 110 during operation. The flex assembly 130 includes a preamplifier printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly 130 terminates at a flex bracket 134 for communication through the base deck 102 to a disc drive printed circuit board (not shown) mounted to the bottom side of the disc drive 100.

Figure 3:
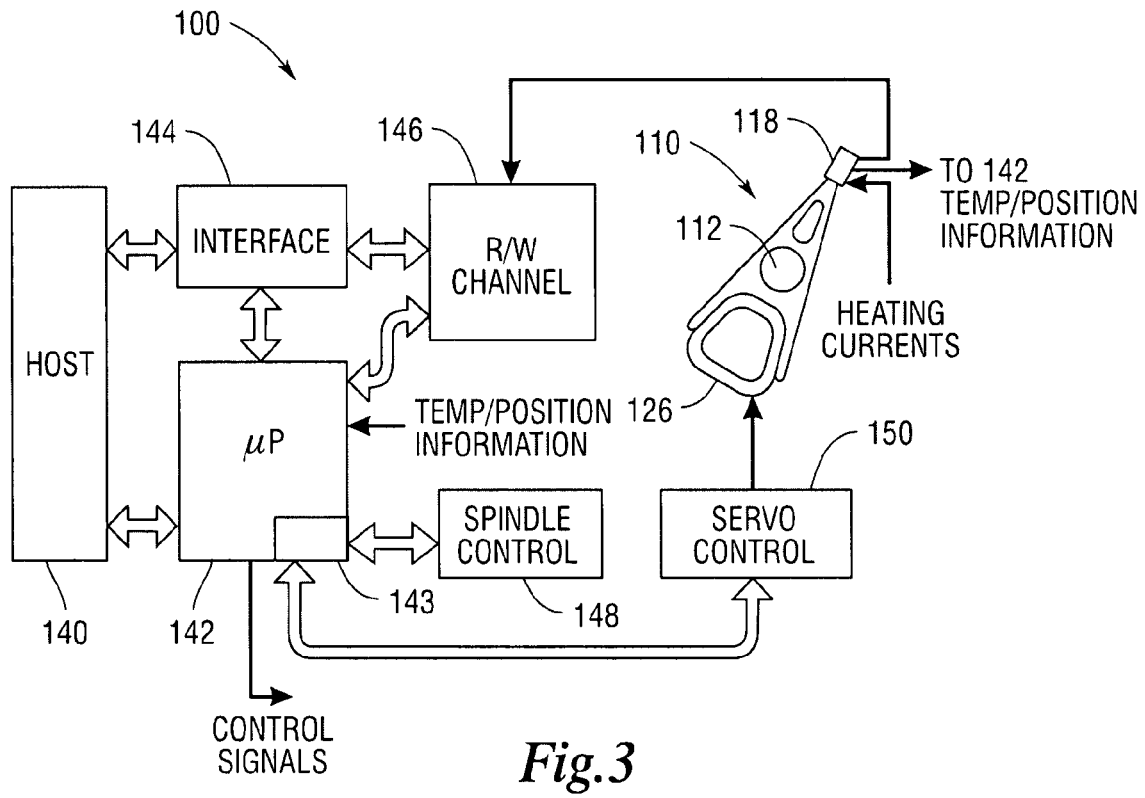
FIG. 3 is a functional block diagram of a disk drive control system employing the teachings of the present disclosure.

Referring now to FIG. 3, shown therein is a functional block diagram of the disc drive 100 of FIG. 2, generally showing the main functional circuits which are resident on the disc drive printed circuit board (not shown) and used to control the operation of the disc drive 100. The disc drive 100 is operably connected to a host product 140 in a conventional manner. Control communication paths are provided between the host product 140 and a disc drive microprocessor 142, the microprocessor 142 generally providing top level communication and control for the disc drive 100 in conjunction with programming for the microprocessor 142 stored in microprocessor memory 143. The memory 143 can include random access memory (RAM), read only memory (ROM) and other sources of resident memory for the microprocessor 142.

The disk(s) 108 are rotated at a constant high speed by the spindle motor 106 under control of a spindle motor control circuit 148. During a seek operation, wherein the actuator 110 moves the head 118 between tracks, the position of the head 118 is controlled through the application of current to the coil 126 of the VCM 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the VCM coil 126, thereby causing the actuator assembly 110 to be pivoted so as to place head 118 in the desired position with respect to the disk 108.

Data is transferred between the host product 140 and the disc drive 100 by way of an interface 144, which typically includes a buffer to facilitate high speed data transfer between the host product 140 and the disc drive 100. Data to be written to the disc drive 100 is thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host product 140. Such operations of the disc drive 100 are well known in the art. The remainder of the signals shown in FIG. 3 are discussed below in conjunction with FIG. 23.

In perpendicular recording, write operations are performed with the face of the pole in "contact" with the disk. As the head moves from the inside to the outside of the disk 108, the amount of the face in contact with the disk increases thus making the tracks wider and creating the skew problem The disclosed microactuator solves that problem.

Figure 4:
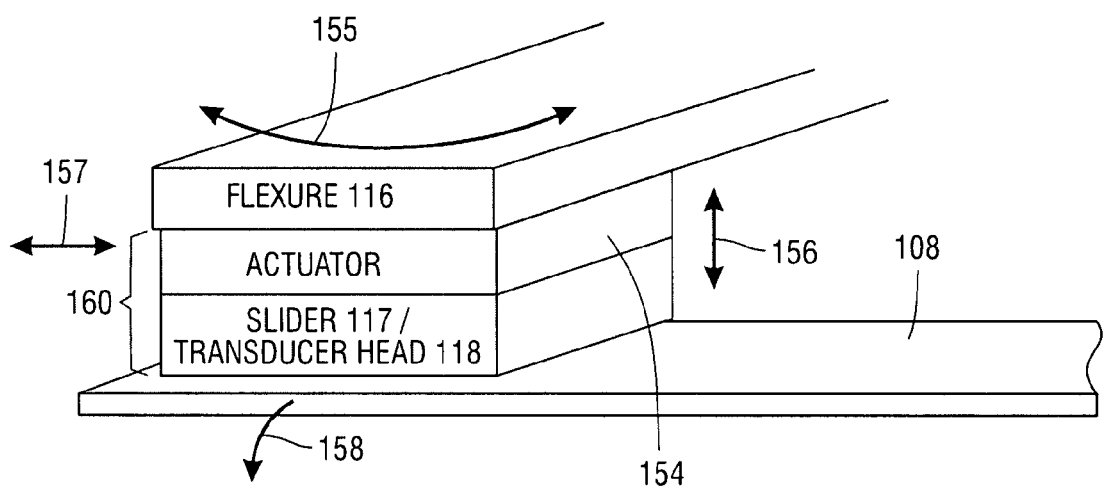
FIG. 4 is a simplified block diagram illustrating an actuator constructed according to the teachings of the present disclosure located between the slider/head assembly and the flexure of an actuator arm.

FIG. 4 is a simplified block diagram illustrating an actuator 154 constructed according to the teachings of the present disclosure located between the slider 117/transducer head 118 and the flexure 116 of an actuator arm (not shown in FIG. 4) to enable the position of the transducer head 118 to be positioned relative to the flexure 116. In FIG. 4, the arrow 155 indicates skew, the arrow 156 indicates fly height, the arrow 157 indicates motion in a cross-track direction, and the arrow 158 indicates motion in an in-track direction. The actuator 154 enables the slider 117/transducer head 118 to be rotated with respect to the flexure 116 to compensate for the skew indicated by arrow 155. The combination of the actuator 154, slider 117, and transducer head 118 may be referred to as a head assembly 160.

Because of the size constraints on the actuator 154, the actuator 154 may be constructed using CMOS MEMS silicon micromachining techniques such as those pioneered by Fedder et al, at Carnegie Mellon University. See U.S. Publication No. 2007/0103029 entitled Self-Assembling MEMS Devices Having Thermal Actuation, the entirety of which is hereby incorporated by reference for all purposes.

Figure 5A:
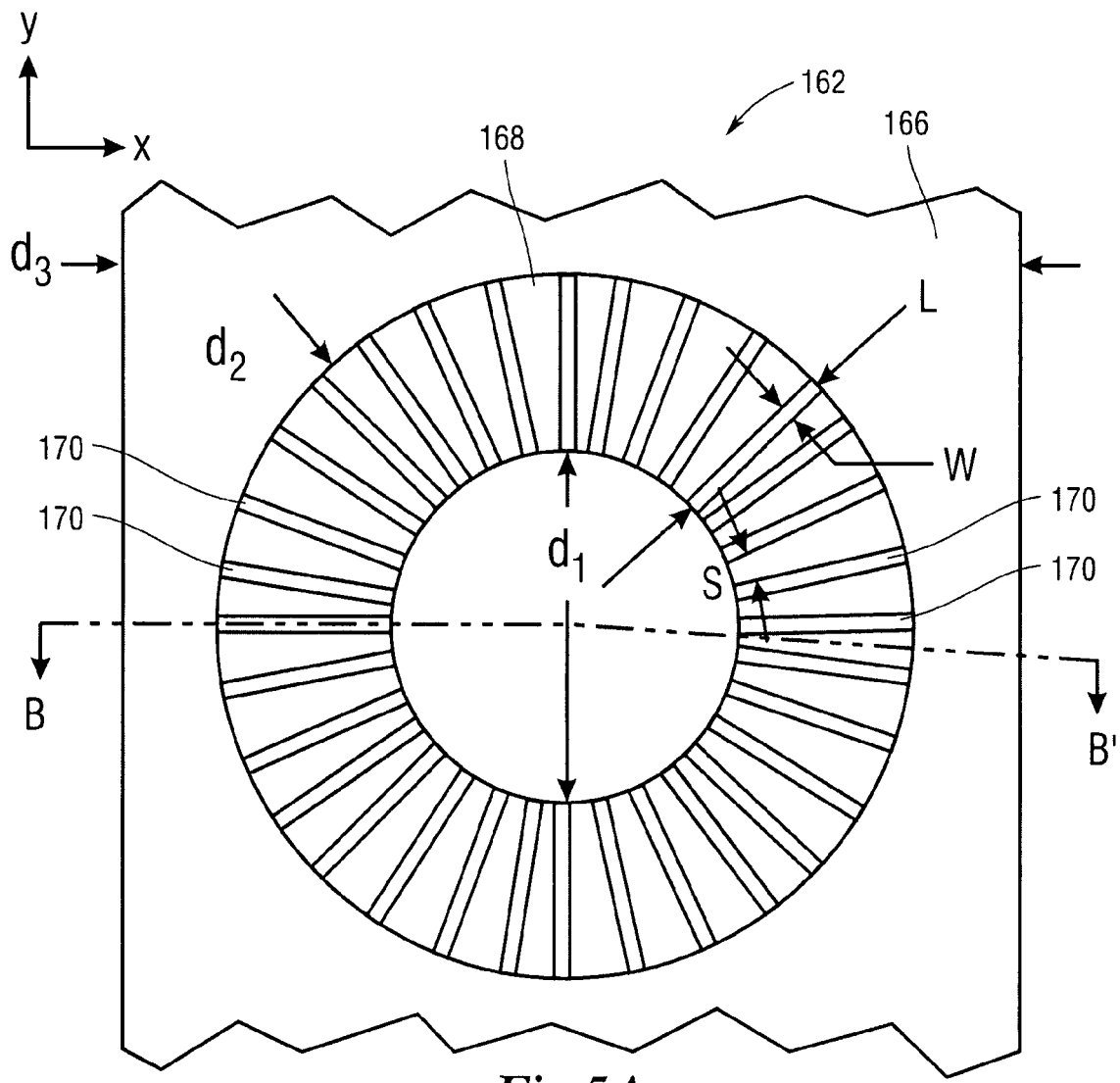
FIG. 5A is a plan view looking down and FIG. 5B is a cross-sectional view along the line B-B in FIG. 5A of one embodiment of a micromachined rotary actuator constructed according to the teachings of the present disclosure.
Figure 5B:
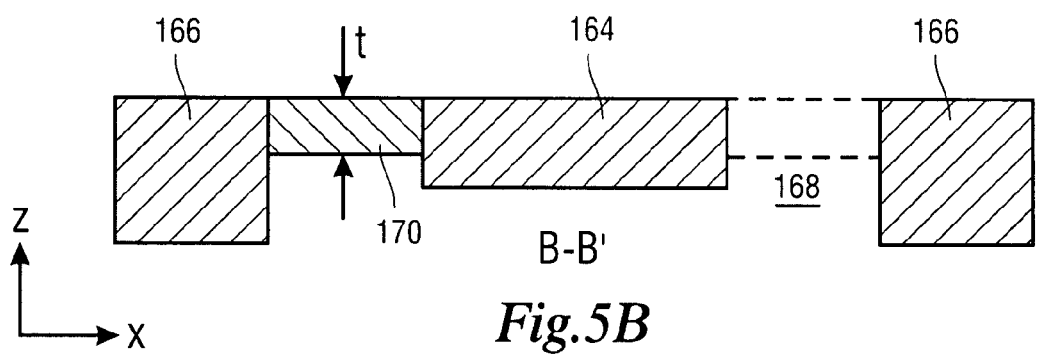

FIG. 5A is a plan view looking down and FIG. 5B is a cross-sectional view along the lines B-B in FIG. 5A of one embodiment of a micromachined rotary actuator 162 constructed according to the teachings of the present disclosure. The rotary actuator 162 is comprised of a central portion 164. An outer portion 166 surrounds the central portion 164 and is separated from the central portion 164 by an in-plane gap 168, seen best in FIG. 5B. Although in FIG. 5A the outer portion 166 is shown completely surrounding the central portion 164, that need not be the case. Additionally, the central portion 164 need not be circular as shown in FIG. 5A.

A plurality of arms 170 is provided with each arm connected at one end to the central portion 164 and connected at another end to the outer portion 166. In that way, each of the arms 170 spans the in-plane gap 168. In the embodiment of FIG. 5, the arms 170 have a length L, a width W, and a thickness t. The distance from the midline of one arm 170 to the midline of an adjacent arm 170 is S where S is greater than W at the perimeter of the central portion 164. Each of the arms 170 is electrothermally actuated as described below.

Figure 6:
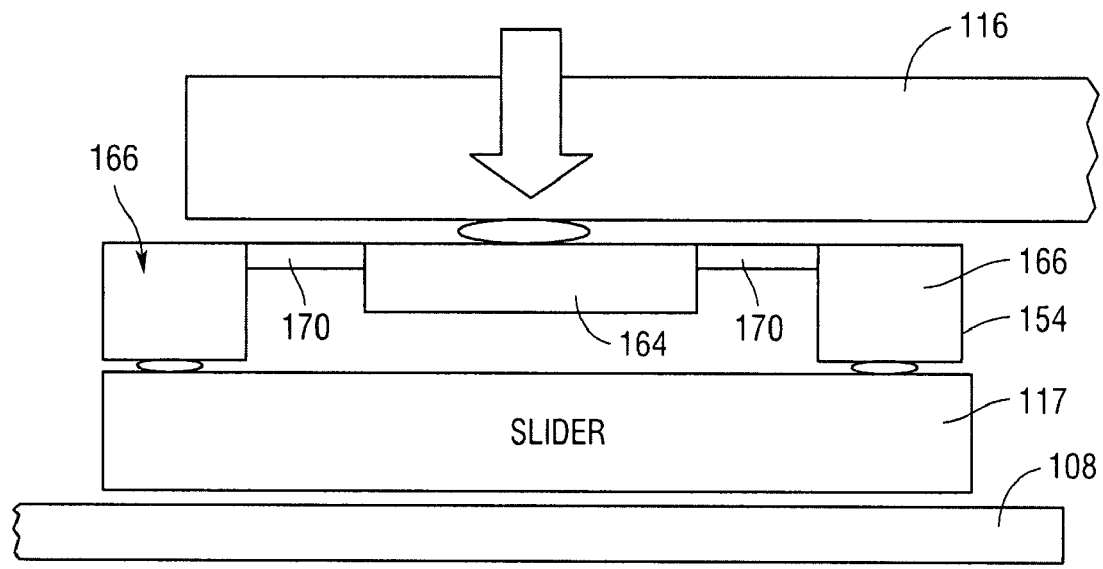
FIG. 6 and FIG. 7 are simplified block diagrams illustrating two possible orientations for a rotary actuator constructed according to the teachings of the present disclosure.
Figure 7:
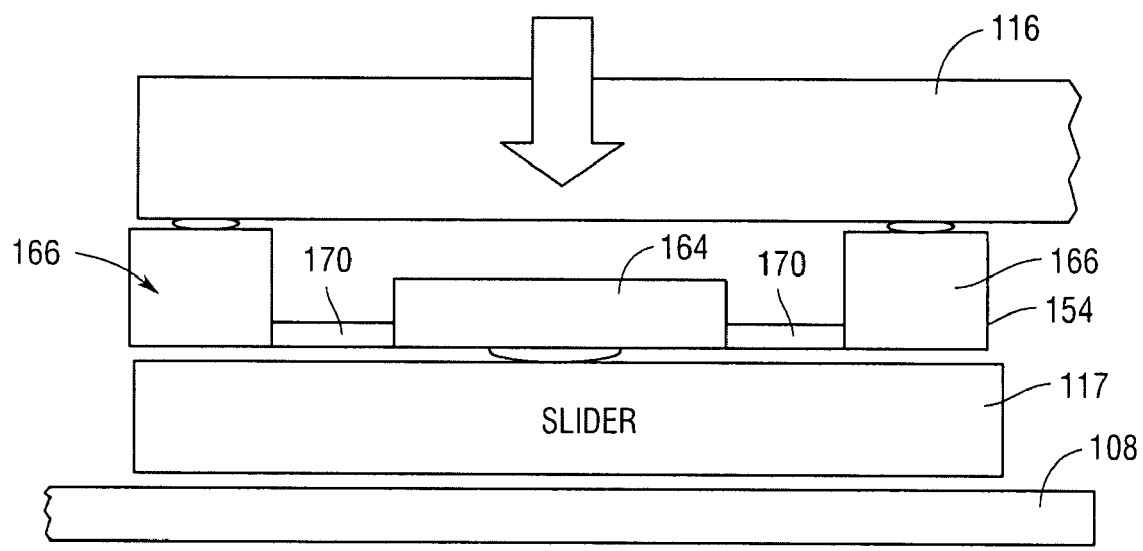

FIGS. 6 and 7 are simplified block diagrams illustrating two possible orientations within a head assembly for the rotary actuator 154. In FIG. 6, the central portion 164 is bonded to the flexure 116 while the outer portion 166 is bonded to the slider 117 using conventionally known bonding techniques. In FIG. 7, the rotary actuator 154 is connected in the opposite manner. More specifically, the outer portion 166 is bonded to the flexure 116 and the central portion 164 is bonded to the slider 117. The reader will recognize that in FIG. 6, the central portion 164 remains fixed, while the outer portion 166 moves in response to heating or cooling of the plurality of arms 170. In FIG. 7, it is the outer portion 166 which remains fixed, and the central portion 164 which moves in response to the heating and cooling of the plurality of arms 170. Thus, either the central portion 164 or the outer portion 166 may function as a stationary portion with the other portion functioning as the rotary portion.

The suspension of the microactuator 154 must be stiff enough to transmit a 10 milli-Newton (mN) force from the flexure 116 to the slider 117 without excessive vertical displacement. Even though the micromachined actuator 154 is shown in two different orientations in FIGS. 6 and 7, the design constraints with respect to the transmission of the 100 mN force remains the same.

FIG. 8A is a plan view looking down on one of the arms 170. Arms 170 are commonly referred to as "beams" in the art. Looking at FIGS. 8A, 8B, and 8C, it is seen that arm 170 is constructed of silicon dioxide 178 having layers of aluminum 176 embedded therein. Materials other than silicon dioxide and aluminum may be used so long as the desired difference in the temperature coefficients of expansion between the two materials is obtained. To the left of a dividing line 180, the layers of embedded aluminum 176 are on the right side of arm 170 as seen in FIG. 8B. To the right of dividing line 180 in FIG. 8A, the layers of embedded aluminum 176 are on the left side of the arm 170 as shown in FIG. 8C. By placing the layers of embedded aluminum 176 on one side of the arm 170 for half of the arm 170, and then placing the layers of embedded aluminum on the other side of the arm 170 for the other half of the arm 170, unequal forces can be built into the arm 170 to cause the arm 170 to move.

The arm 170 is referred to as consisting of two bimorphs in series. Typically, these bimorphs have static deflection after release and before actuation. This static deflection is due to the fact that the metal within the beams typically has a tensile stress relative to the oxide, causing the metal side of the beam to contract more than the oxide side. The two bimorphs of opposite sign in series help to simulate a guided end condition in one of the ends of the arm. That situation is shown FIGS. 9A and 9B which illustrate a single arm 170 before microstructure release (FIG. 9A) and after release (FIG. 9B).

Figure 10A:
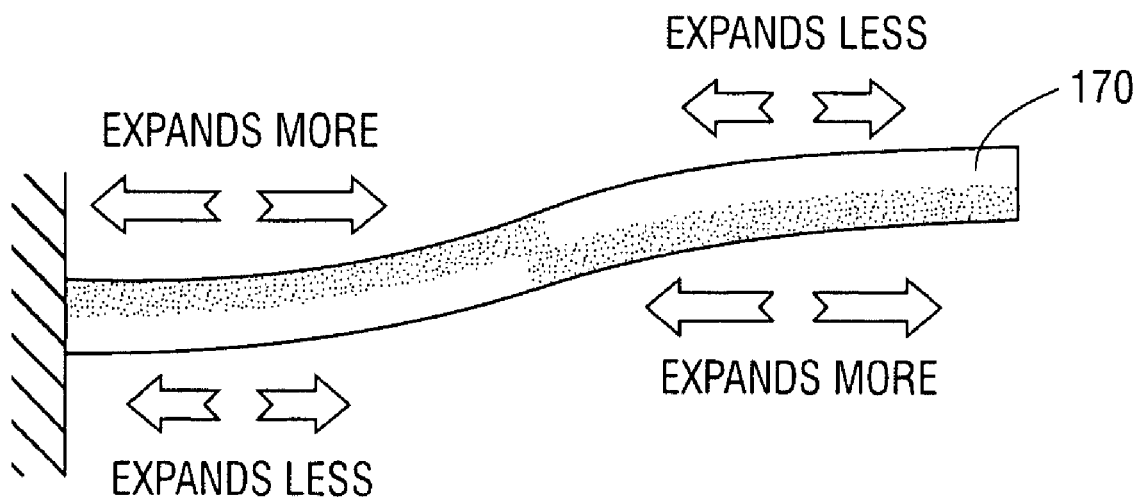
FIGS. 10A and 10B are plan views looking down on one embodiment of a single arm of an actuator constructed according to the teachings of the present disclosure before and after heating, respectively. The labeling in FIG. 10A indicates relative expansions that will happen upon heating to produce the deflection in FIG. 10B.
Figure 10B:
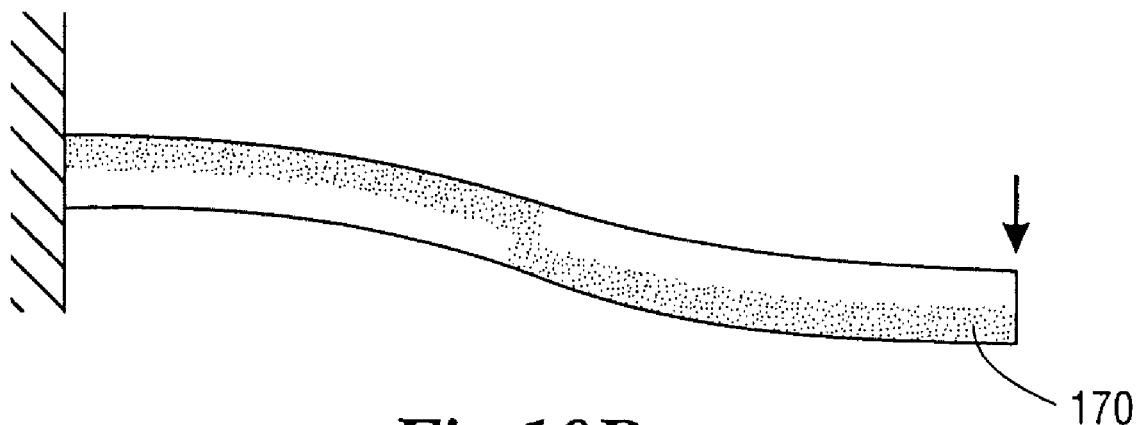

FIGS. 10A and 10B illustrate the result of electrothermal actuation of a single arm 170. FIG. 10A shows the arm just after heating but before motion while FIG. 10B shows the same arm 170 after heating and after motion. Passing electric current through heating conductors (not shown) embedded in the arm or adjacent to the arm heats the arm. This current is typically delivered via the metal interconnect in the arm, which themselves are not sufficiently resistive to cause heating. As mentioned, the two sides of the bimorph (metal and oxide) have different coefficients of thermal expansion. The different coefficients of thermal expansion cause differential expansion of the two sides of the bimorph, resulting in a bending moment. As the bimorphs bend, the two ends of the arm displace laterally with respect to each other. If the two series bimorphs are the same length, there is no relative rotation of the two ends of the beam, resulting in the so called "guided end condition." If the two bimorphs are not the same length, then there will be some relative rotation of the two ends of the beam as the beams move laterally. Such relative rotation may be desirable to accommodate the rotation of the movable portion of the microactuator.

Figure 11A:
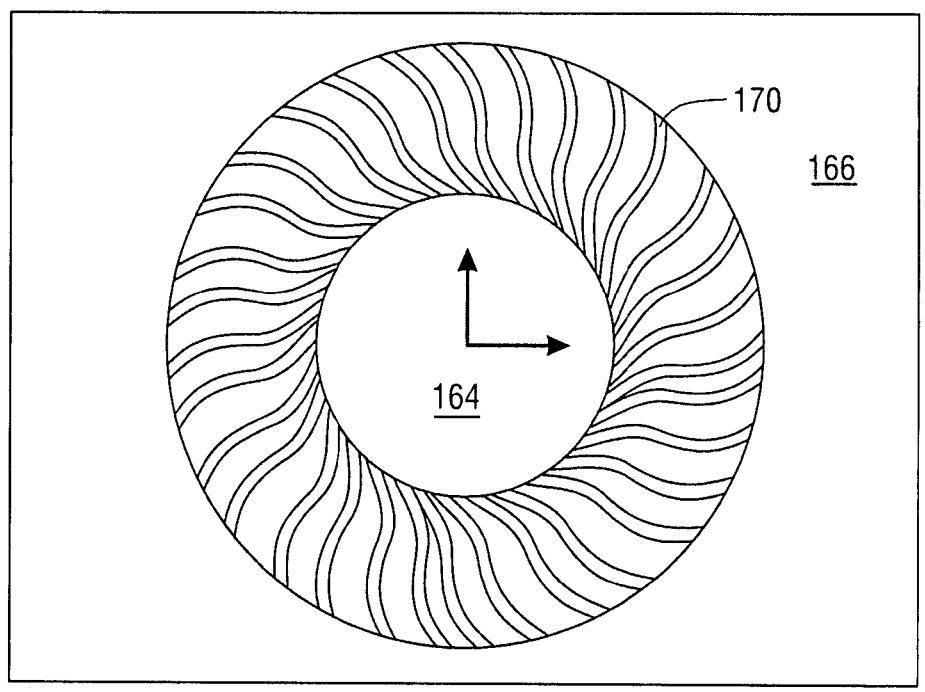
FIGS. 11A and 11B are plan views looking down on one embodiment of a micromachined rotary actuator constructed according to the teachings of the present disclosure before and after heating of the plurality of arms, respectively.
Figure 11B:
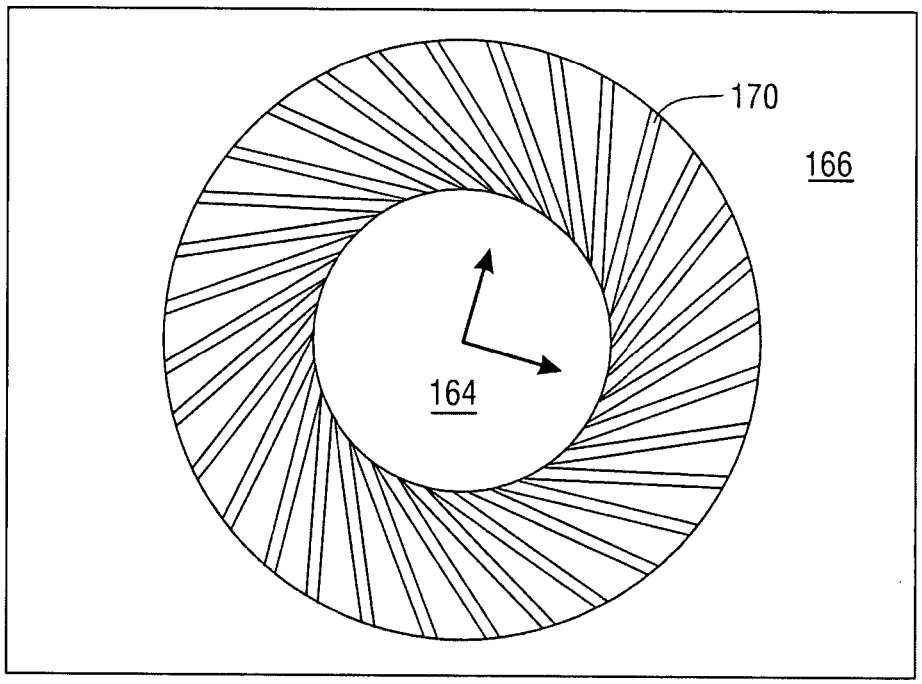

FIGS. 11A and 11B correspond to FIGS. 10A and 10B, respectively. FIG. 11B shows how the collective movement of all of the arms 170 results in rotation of the outer portion 166 relative to the central portion 164. In this case the arms 170 comprising the suspension attach to the central portion 164 and to the outer portion 170 at an angle. As the arms 170 bend, they move laterally and they straighten, resulting in the movement of the two attachment points for each arm away from each other.

Electrothermal operation allows relatively low voltage driving circuitry (not shown), but dissipates more power than electrostatic methods. The speed of rotation depends on how quickly the bimorphs heat up and cool down. Low thermal conductivity in the arms will lead to quick heating and fast positive rotation with low power, but slower cooling and slow negative rotation (slow return to the starting point). Conversely, high thermal conductivity in the arms will lead to slow heating and slow positive rotation with higher power, but fast cooling and fast negative rotation. The thermal design of the arms is important for fast response with reasonable power requirements. Additionally, control of the temperature of the arms enables the movement to be controlled so that a range of rotations can be achieved.

In the skew compensation mode, the rotational slew rate must be sufficient to move the rotary actuator 154 through its full range of motion in the time needed for the VCM 124 to move the head assembly 160 from the inside diameter to the outside diameter of the disk 108 in FIG. 2. This time is on the order of 5 ms in currently available high performance commercial disk drives. Rotary motion of the rotary actuator 154 on the order of ±2 degrees will provide enough movement to be useful for skew compensation. This ±2 degree specification corresponds to a lateral displacement of the ends of the arms 170±1.74 microns for an actuator with a central portion having a diameter of 50 microns. Currently, there is a continuously available analog signal indicating the position of the head on the disk. That signal could be used to implement known, fixed amounts of skew compensation, in discrete steps or continuously changing skew compensation adjustments. Alternatively, skew could be measured and either discrete or continuous amounts of skew compensation implemented in response to the measured amount of skew.

After arriving at a data track, the system switches to track following mode. The rotary actuator 154 maintains a nominal angular displacement to compensate for skew, and then rotates very slightly around that nominal angular displacement to produce the cross-track lateral displacements necessary to keep the head on the data track. The rotation of the head will be very small in this mode. Typical cross-track displacements during track following will be less than 100 nm. If the center of rotation is 250 µm from the transducer head 118, the rotation of the transducer head 118 will only be 200 µradians or 1.2 mdeg. This small rotation will not affect the skew compensation. In track following mode it is desirable that the rotation rate be sufficient to move the head at a bandwidth of several kilohertz over this 100 nm range of motion.

Figure 12:
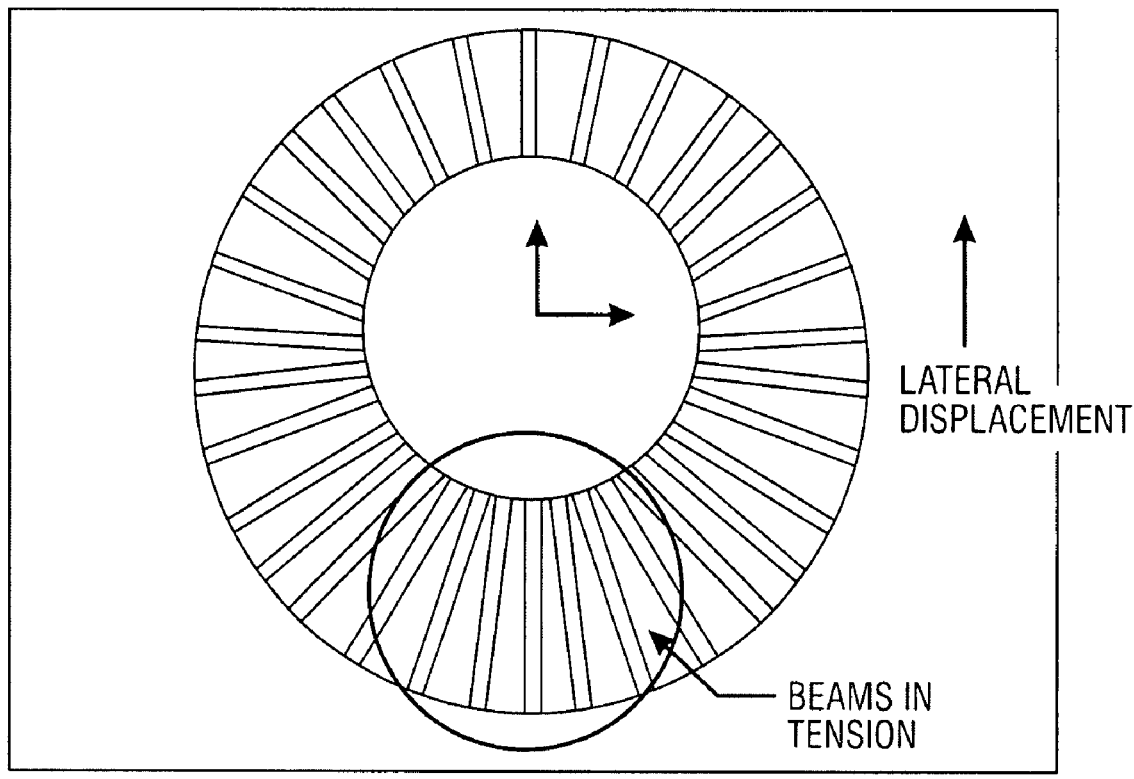
FIG. 12 is a plan view looking down on one embodiment of a micromachined rotary actuator constructed according to the teachings of the present disclosure which is experiencing lateral displacement.

It is desirable to make the disclosed rotary actuator 154 stiff enough to resist two undesired modes of displacement while making it compliant enough in torsion to allow sufficient stroke. These two undesirable displacement modes are lateral displacement as shown in FIG. 12 and axial displacement shown in FIG. 13. The lateral displacement in FIG. 12 will typically be in response to a shock event and would cause either down track or cross track motion of the head assembly. The axial displacement (normal to the disk) in FIG. 13 will principally occur in response to the static load of 10 mN from the head suspension.

Figure 13:
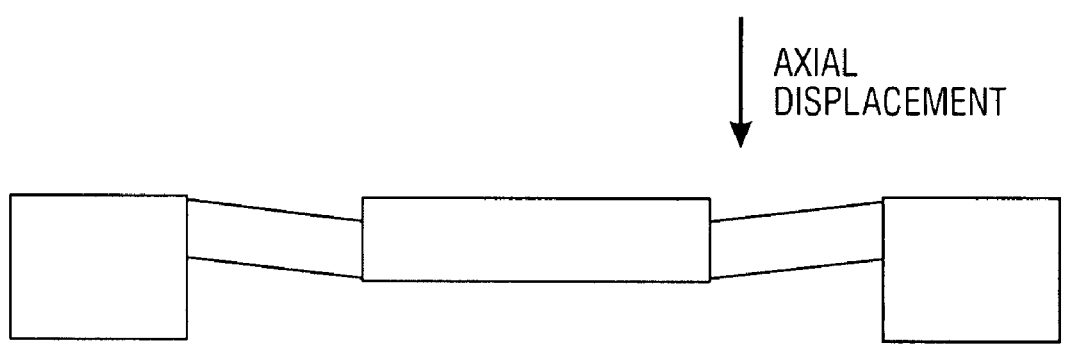
FIG. 13 is a cross-section view of one embodiment of a micromachined rotary actuator constructed according to the teachings of the present disclosure which is experiencing axial displacement.
Figure 14:
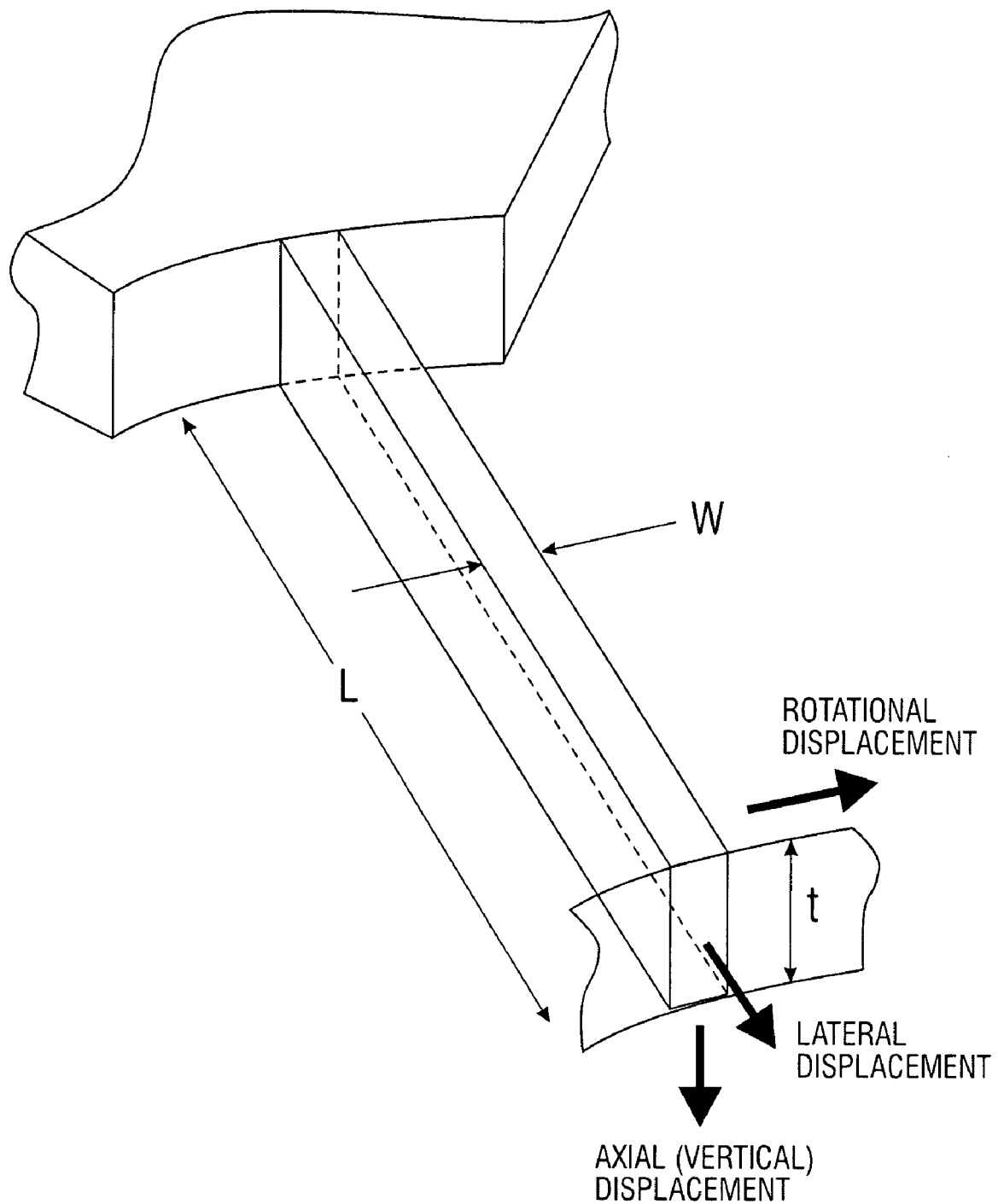
FIG. 14 shows three orthogonal beam deflection modes that can be analyzed during the design of the arms of a micromachined rotary actuator constructed according to the teachings of the present disclosure.

FIG. 14 shows the three orthogonal arm deflection modes that can be analyzed to accomplish the desired design tradeoff. These three different arm deflections correspond to the three different modes of displacement, i.e., the rotary displacement shown in FIG. 11B, the lateral displacement shown in FIG. 12, and the axial displacement shown in FIG. 13. A simple set of design trade-offs can be seen from the following set of steps to size the arms.

1) Identify minimum beam width W and maximum beam thickness t as set by the selected CMOS MEMS process. In the examples shown below, these are 2.4 µm and 7 µm CMOS processes, respectively.

2) Select a desired rotational stroke in degrees.

3) Select the length L of the arms needed to enable the desired rotational stroke.

4) Assess the lateral stiffness of the arms, i.e., resistance to the lateral displacement shown in FIG. 12. For this calculation it is assumed that only the subset of the arms that are in tension (circled in the FIG. 12) contribute to this stiffness. The arms on the other side of the central portion are in compression, and not assumed to contribute. These arms deflect in the direction labeled "lateral displacement" in FIG. 12. This compliance also allows the calculation of a resonant frequency for lateral vibration based on the slider's mass. In the figures that follow, a total mass of 10 mg is assumed, which is an overestimate of the mass even including the actuator mass. Additionally, this stiffness allows the response to shock to be assessed, as well. In the discussion that follows, a shock of 300 g is assumed. If the arms are attached at a small angle as indicated in FIG. 11A, then the stiffness in tension and compression would be less, but there would be no buckling of the arms and more arms would contribute to the stiffness. A detailed design will account for these trade-offs.

5) Assess the axial stiffness for axial displacements, i.e., the resistance to the axial displacement shown in FIG. 13. For this calculation it is assumed that all arms contribute equally, and the deflection of interest is the deflection under 10 mN of load.

Figure 15:
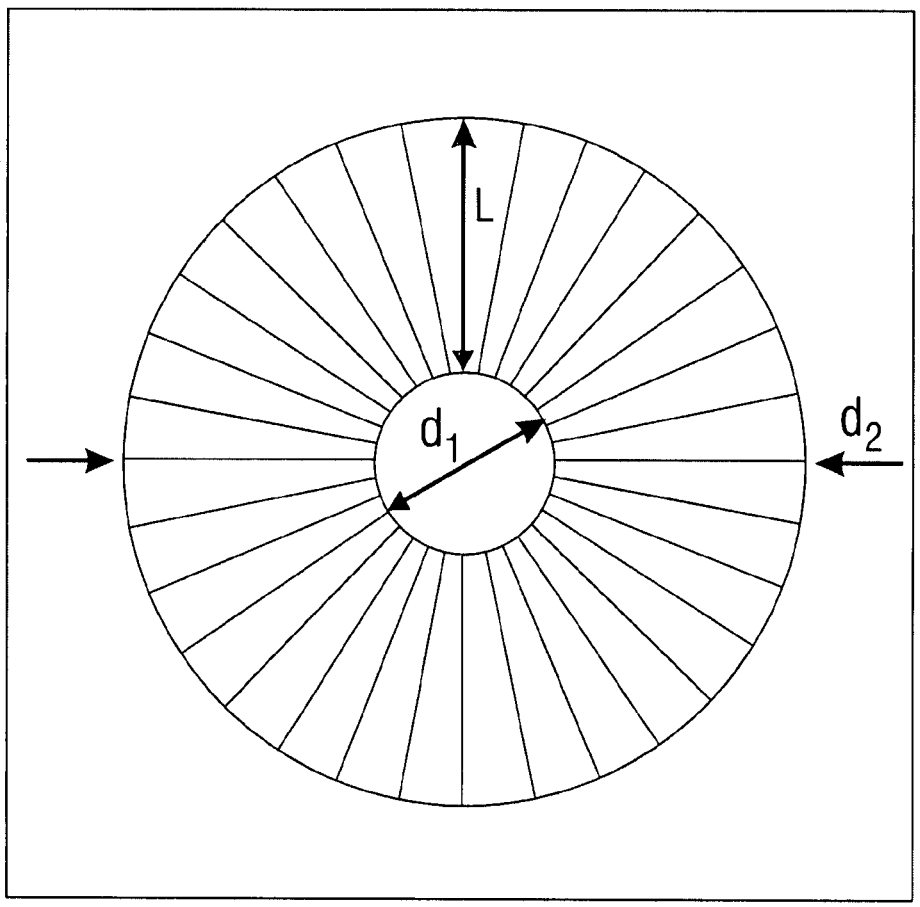
FIG. 15 illustrates some typical stiffness numbers for a micromachined rotary actuator constructed according to one embodiment of the present disclosure.

FIG. 15 shows the rotational, lateral, and axial stiffness for typical microactuator dimensions, indicated in the sub-table labeled assumptions, and schematic top view. In this case the arms are 140 µm long (L). The resulting rotational stiffness permits a rotational displacement of ±2 degrees for a 140 degree Celsius temperature rise in the bimorph temperature. Assuming slider mass of 10 mg (which is significantly greater than current sliders), the lateral stiffness for this set of parameters gives a displacement of 0.2 µm in response to a 300 g shock and a resonant frequency for lateral vibration of 11 kHz. It also allows an axial displacement under a static load of 1 g of approximately 5 µm.

Figure 16:
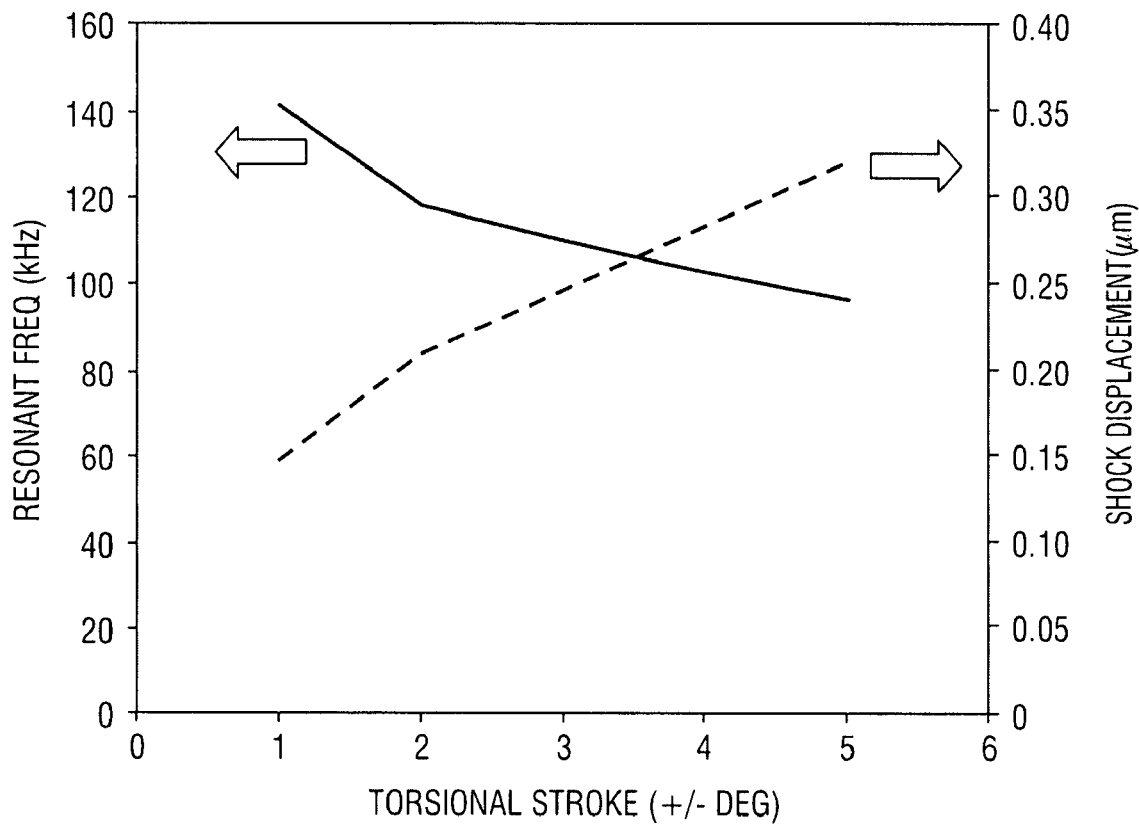
FIG. 16 illustrates lateral displacement under a shock of 300 g vs. torsional stroke for a micromachined rotary actuator constructed according to one embodiment of the present disclosure. Also shown is the resonant frequency for lateral displacement for one embodiment.
Figure 17:
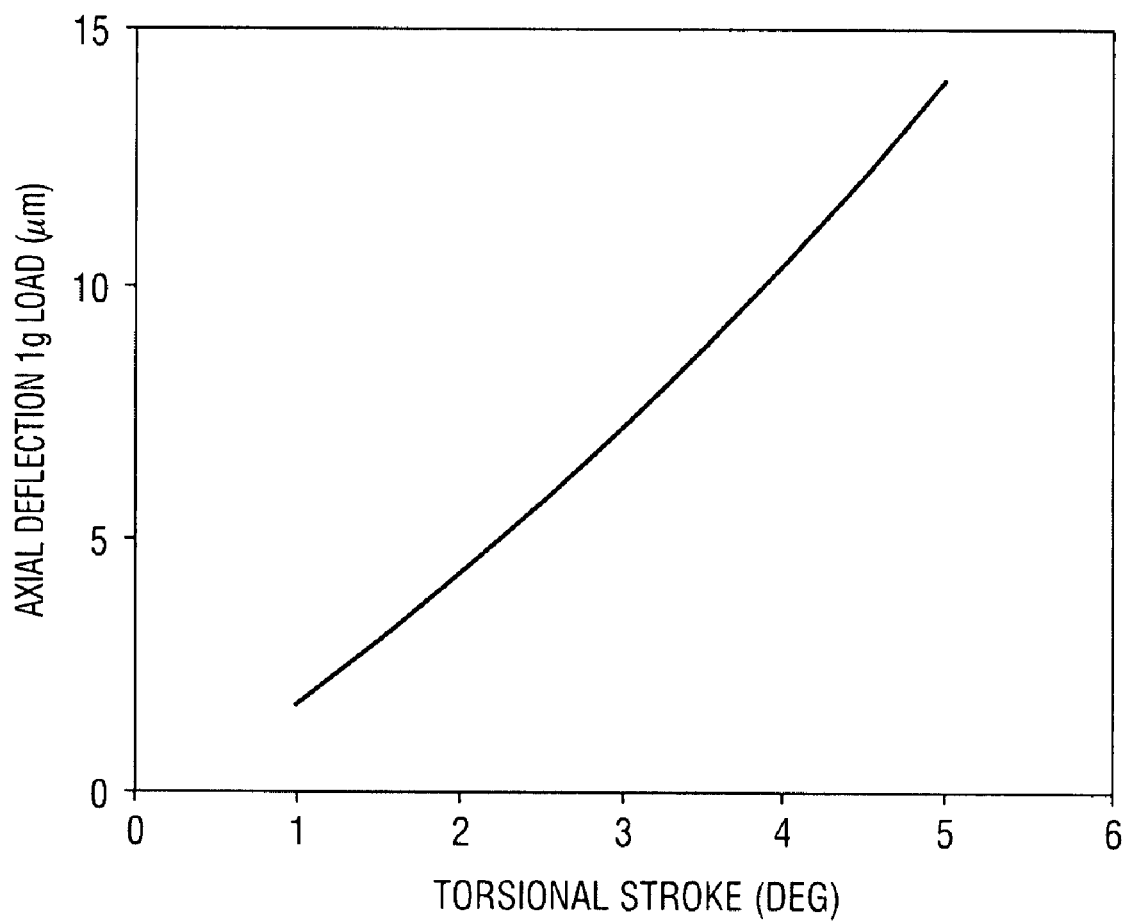
FIG. 17 illustrates axial displacement under a one gram load vs. torsional stroke for a micromachined rotary actuator constructed according to one embodiment of the present disclosure.

The trade-off in torsional stroke (at a ΔT of 140 C) with the lateral stiffness is shown in FIG. 16, while a similar tradeoff for axial displacement is shown in FIG. 17. For FIG. 16, the slider mass is again assumed to be 10 mg, and the shock is assumed to be 300 g with an infinitely long impulse (worst case).

For FIG. 17, the gram load from the suspension is assumed to be 1 g (10 mN). From these two figures it is significant to note that the achievable stiffnesses and torsional strokes with this design are quite promising. The only stiffness that is marginal is the axial stiffness, but this could be increased substantially with only moderately thicker beams. Additionally, if a bearing point were used this might eliminate the need for significant axial stiffness. Advanced CMOS processes, which have a stack height of over 13 microns, can provide thicker arms with greater axial stiffness. A custom process can also be developed. In addition, other materials with high temperature coefficients and high coefficients of thermal expansion (e.g., nickel) can be implemented that will boost actuator efficiency.

The micromachined actuator 154 disclosed herein need not be limited to the construction shown, for example, in FIG. 5A. It has already been mentioned that the central portion 164 need not be circular. Similarly, it has been mentioned that the outer portion 166 need not completely surround the central portion 164. Additional embodiments include attachment angles other than the perpendicular attachment angle illustrated in FIG. 5A between the arms 170 and the central portion 164 and outer portion 166. Other embodiments also include arms 160 which are of cross sectional shapes other than rectangular. Some examples follow.

Figure 18:
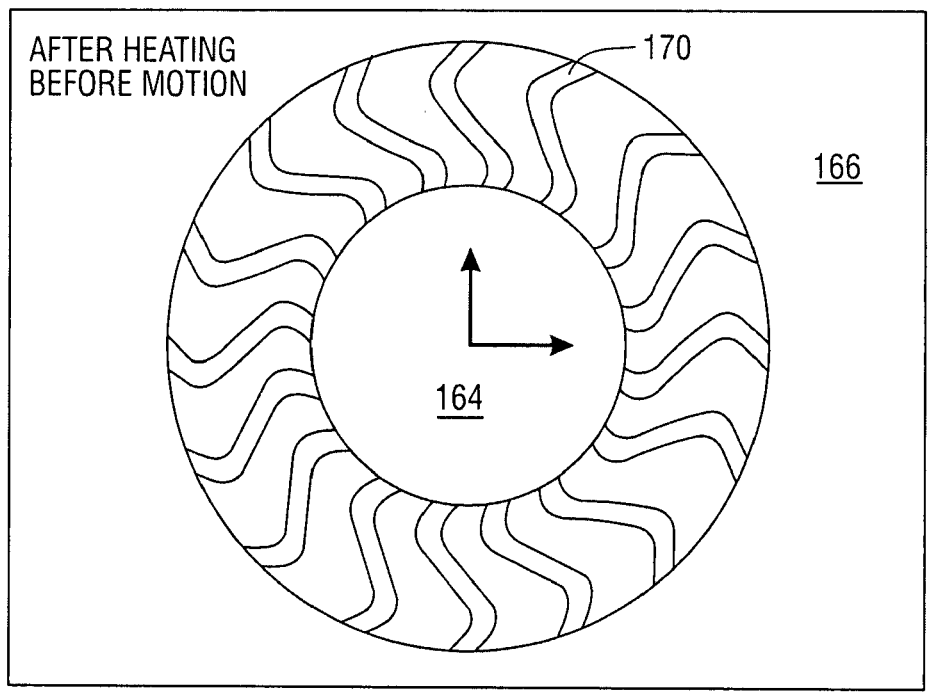
FIG. 18 is a plan view of another embodiment of a micromachined rotary actuator constructed according to the teachings of the present disclosure and having radially aligned arms attached at an angle.

FIG. 18 is a plan view of another embodiment of a micromachined rotary actuator constructed according to the teachings of the present disclosure in which the arms are radially aligned and attached to the central portion 164 and the outer portion 166 at an angle.

Figure 19:
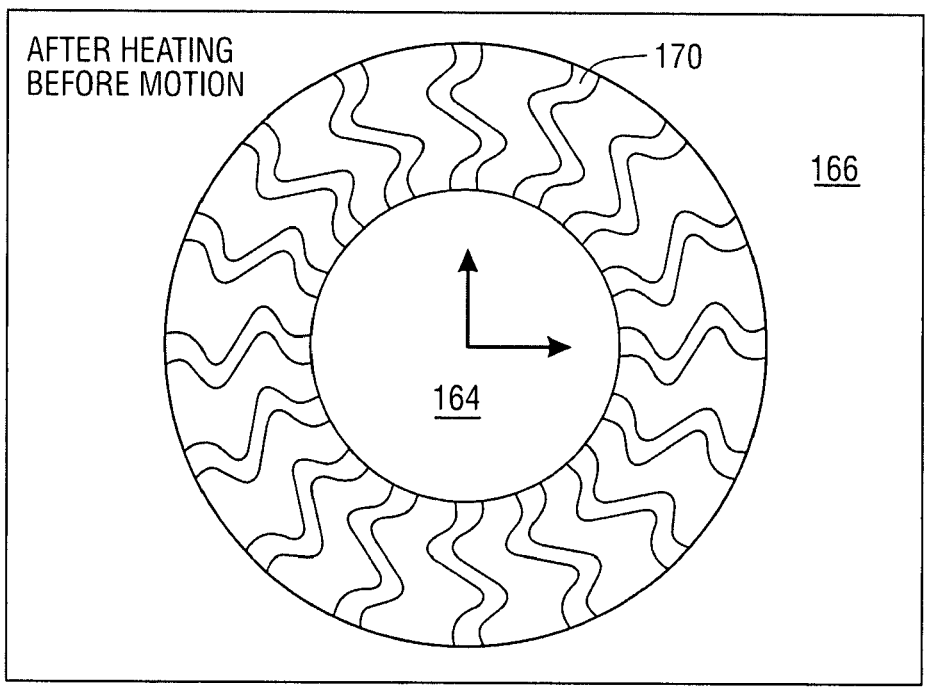
FIG. 19 is a plan view of another embodiment of a micromachined rotary actuator constructed according to the teachings of the present disclosure and having radially aligned arms attached perpendicularly.

FIG. 19 is a plan view of another embodiment of a micromachined rotary actuator constructed according to the teachings of the present disclosure and having radially aligned arms 170 attached perpendicularly to the central portion 164 and outer portion 166.

Figure 20:
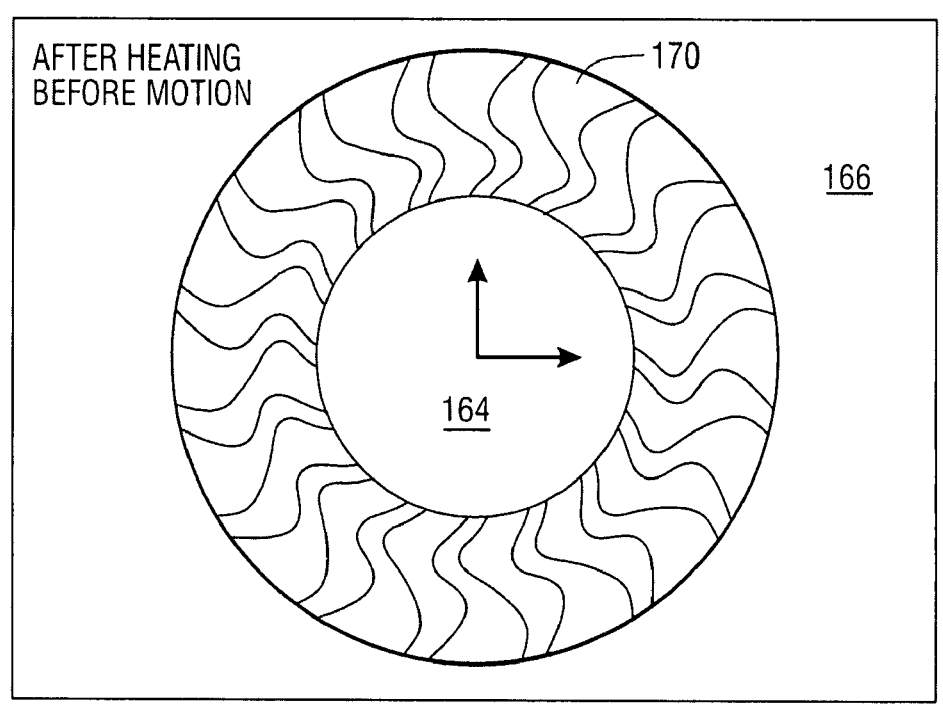
FIG. 20 is similar to FIG. 19, but the arms are trapezoidal in shape.

FIG. 20 is a plan view of another embodiment of a micromachined rotary actuator constructed according to the teachings of the present disclosure and having radially aligned, trapizoidally shaped arms, attached perpendicularly to the central portion 164 and outer portion 166.

Figure 21A:
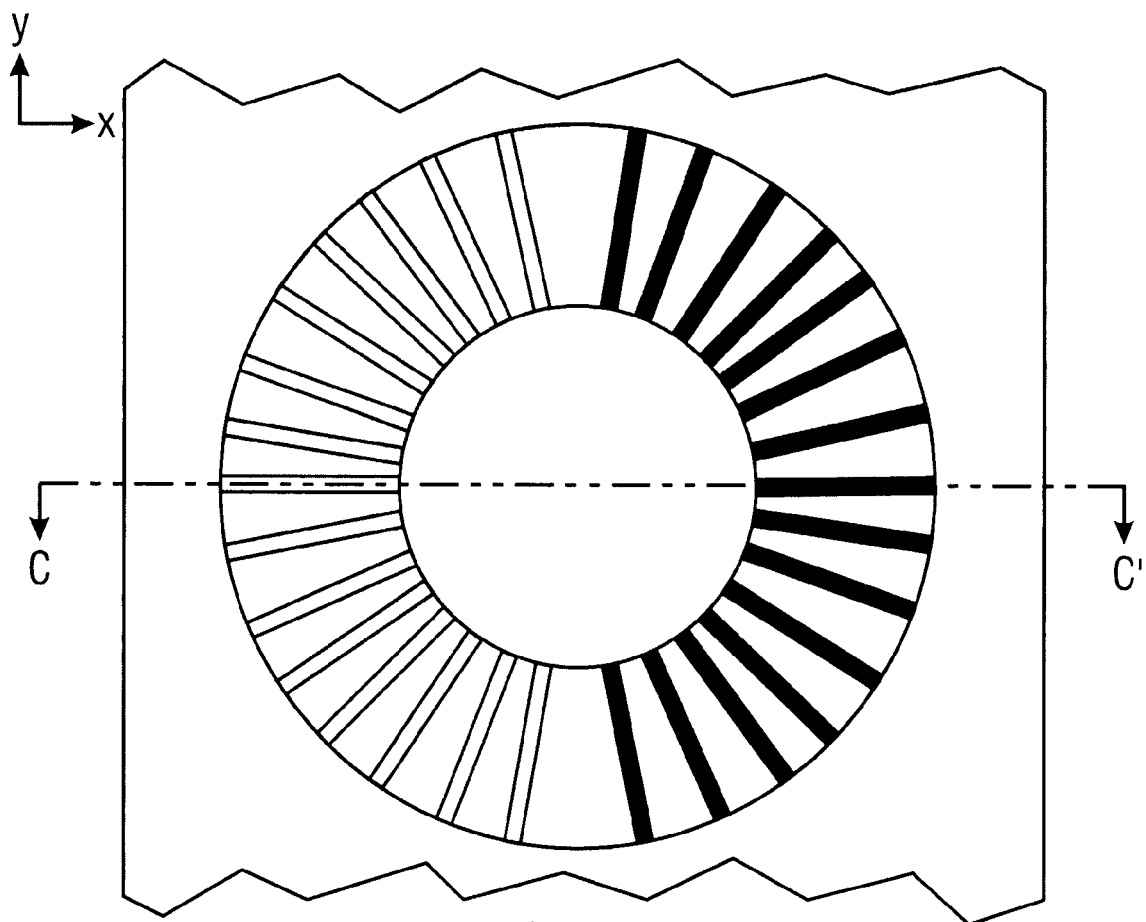
FIG. 21A is plan view illustrating another embodiment of a micromachined rotary actuator constructed according to the teachings of the present disclosure and having segmented heaters to accomplish multiple motions shown in FIGS. 21B (before heating) and 21C (after heating). The motion shown in FIG. 21C is in addition to rotary motion not shown in FIG. 21C.
Figure 21B:
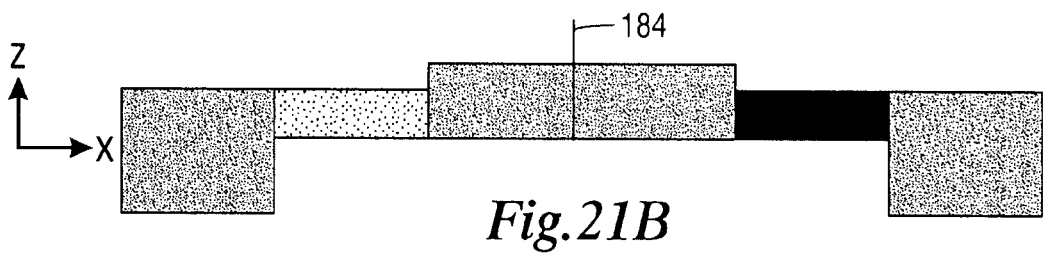
Figure 21C:
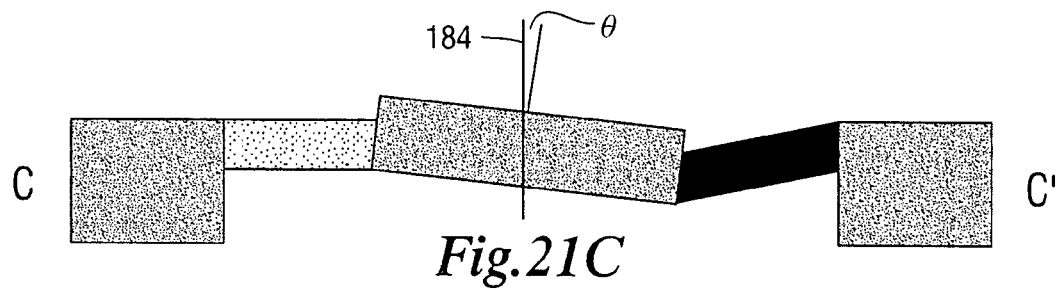

FIG. 21A is a plan view illustrating another embodiment of a micromachined rotary actuator constructed according to the teachings of the present disclosure. In the embodiment shown in FIG. 21A, the arms 170 from the twelve o'clock position to the six o'clock position can be heated independently of the arms from the six o'clock position to the twelve o'clock position. By making the arms independently actuable, various types of movement can be obtained. For example, as shown in FIGS. 21B and 21C, a small amount of rotation θ can be obtained with respect to an axis 184.

Figure 22:
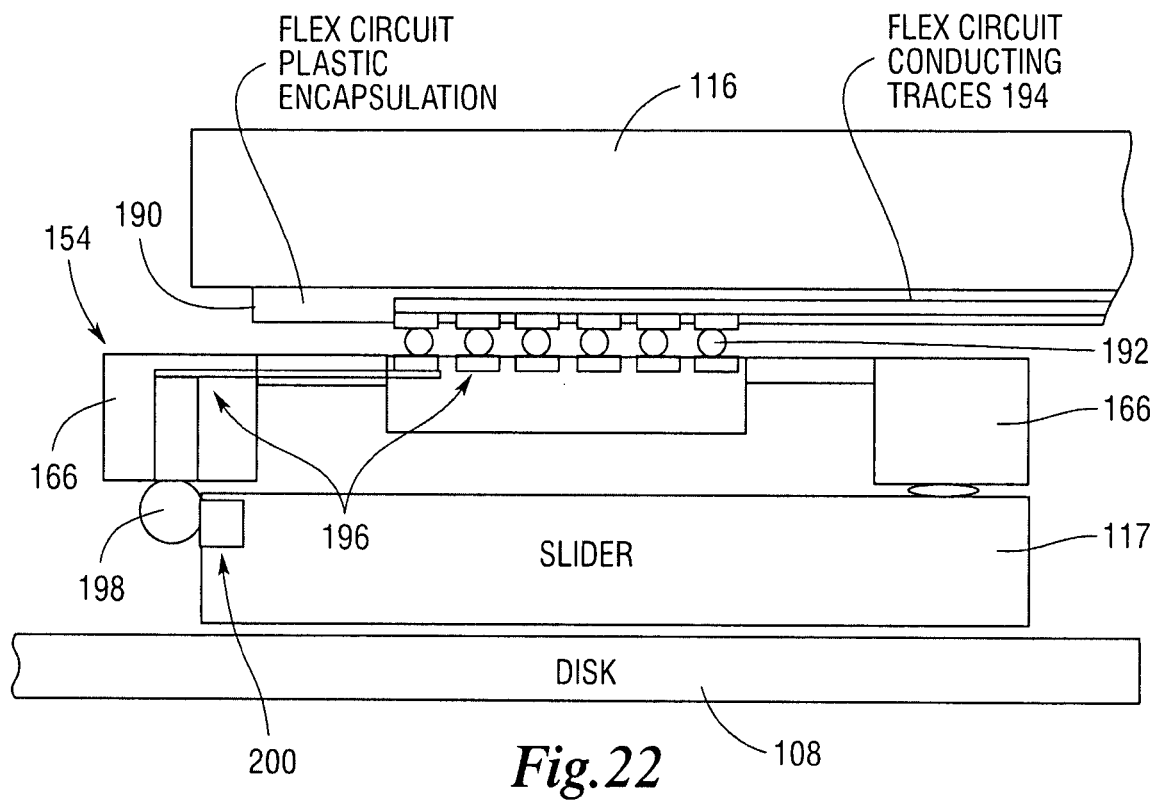
FIG. 22 is a simplified diagram illustrating a possible interconnect routing for data and control signals.

FIG. 22 illustrates a possible interconnect routing. Those of ordinary skill in the art will recognize that data signals representing data read from disk 108 or data to be written to disk 108 could pass through actuator 154 and avoid the use of a flexible connection (not shown) which bypasses the actuator 154. Additionally, control signals, perhaps in the form of currents sent to heating conductors positioned in one or more arms, must be delivered to the actuator 154. FIG. 22 illustrates one possible embodiment for accomplishing the delivery of those signals.

In FIG. 21, a flex circuit 190 is connected to the flexure 116 to facilitate the relative motion between the flexure 116 and the actuator 154. Solder connections 192 connect conducting traces 194 in the flex circuit 190 to internal metal conductors 196 formed in the actuator 154. The internal metal conductors 196 are connected to pads 200 on the slider 117 through solder joints 198.

Figure 23:
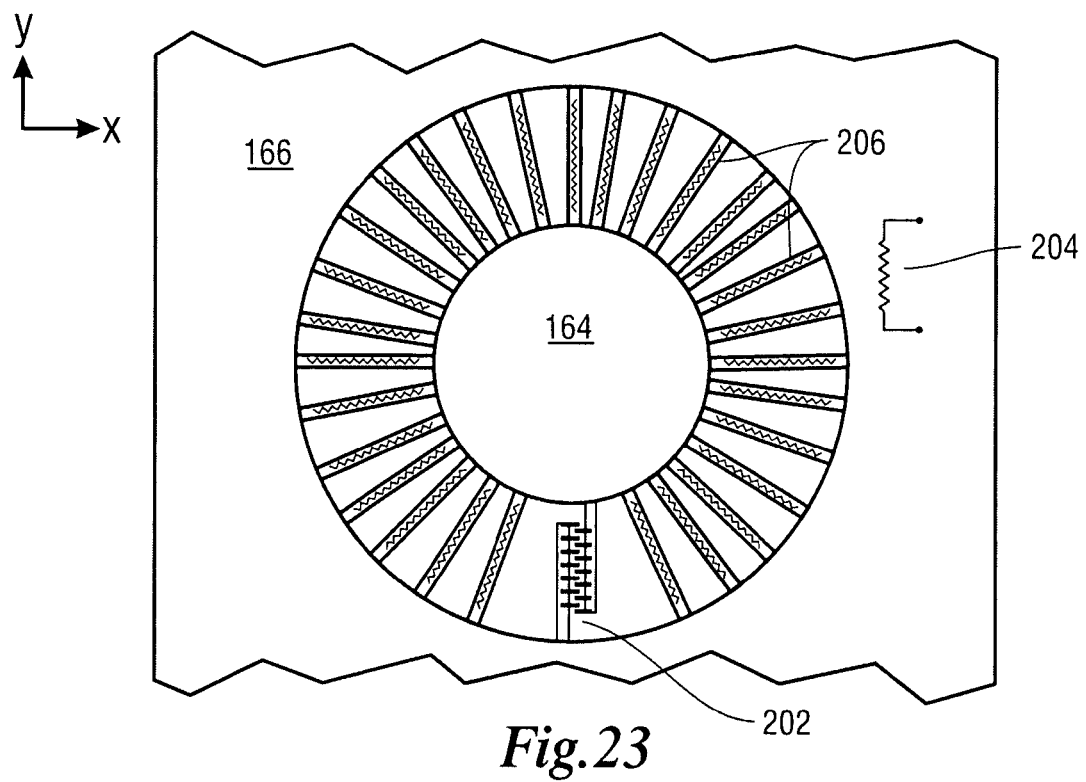
FIG. 23 is plan view illustrating another embodiment of a micromachined rotary actuator constructed according to the teachings of the present disclosure and having internal position and temperature sensing.

Finally, FIG. 23 illustrates a micromachined rotary actuator carrying a capacitive type of position detector 202 and a resistor 204 having a resistance that varies as a function of temperature. The position detector 202 and resistor 204 produce signals which may, after conversion to digital form, be input to the microprocessor 142 of FIG. 3. The microprocessor 142, in response to the position and temperature information, may produce control signals for generating, via digital to analog conversion circuits, the currents applied to the heating conductors 206. The D/A and A/D circuits may be discrete components or fabricated as part of the actuator 154. The control signals generated by the microprocessor 142 may produce either rotary motion in discrete steps or continuous motion. Heating conductors could additionally or alternatively be located in the central portion 164 and/or the outer portion 166.

While the present disclosure has been described in connection with preferred embodiments thereof, those of ordinary skill in the art will recognize that many modifications and variations are possible. The present invention is intended to be limited only by the following claims and not by the foregoing description which is intended to set forth the presently preferred embodiments.

What is claimed is:

1. A micromachined rotary actuator, comprising:
    a central portion;
    an outer portion at least partially surrounding said central portion and separated from said central portion by an in-plane gap;
    a plurality of arms each connected at one end to said central portion and at another end to said outer portion so as to span said in-plane gap, each arm being comprised of a plurality of different horizontally stacked materials laterally offset in the same plane positioned to enable each arm to bend in-plane when heated; and
    conductors for heating said arms.

2. The actuator of claim 1 wherein said central portion is circular in shape and said outer portion completely surrounds said central portion to define a disk-shaped, in-plane gap between said central portion and said outer portion.

3. The actuator of claim 2 wherein said arms are radially aligned.

4. The actuator of claim 1 wherein said plurality of arms extends substantially perpendicularly from each of said central portion and said outer portion.

5. The actuator of claim 1 wherein said plurality of arms extends at an angle from each of said central portion and said outer portion.

6. The actuator of claim 1 wherein said heating conductors are positioned in one or more of said plurality of arms, said central portion, and said outer portion.

7. The actuator of claim 6 wherein said heating conductors are connected so as to be energized one of individually, in groups, or altogether.

8. The actuator of claim 1 wherein said arms have one of a rectangular or trapezoidal cross section.

9. A head assembly for a disk drive, comprising:
    a micromachined rotary actuator having a stationary portion configured for connection to a flexure and a moving portion capable of providing rotary motion with respect to said stationary portion;
    wherein said actuator comprises a plurality of arms each connected at one end to a central portion and at another end to an outer portion so as to span an in-plane gap, each arm being comprised of a plurality of different horizontally stacked materials laterally offset in the same plane positioned to enable said arms to bend in-plane when heated;

a slider connected to said moving portion; and a transducer head carried by said slider.

10. The head assembly of claim 9, wherein said outer portion at least partially surrounds said central portion and is separated from said central portion by said in-plane gap;

wherein said actuator comprises conductors for heating said arms.

11. The head assembly of claim 10 wherein said central portion is said stationary portion and said outer portion is said moving portion.

12. The head assembly of claim 10 wherein said outer portion is said stationary portion and said central portion is said moving portion.

13. The actuator of claim 10 wherein said central portion is circular in shape and said outer portion completely surrounds said central portion to define a disk-shaped, in-plane gap between said central portion and said outer portion.

14. The actuator of claim 13 wherein said arms are radially aligned.

15. The actuator of claim 10 wherein said plurality of arms extends substantially perpendicularly from each of said central portion and said outer portion.

16. The actuator of claim 10 wherein said heating conductors are positioned in one or more of said plurality of arms, said central portion, and said outer portion.

17. The actuator of claim 16 wherein said heating conductors are connected so as to be energized one of individually, in groups, or altogether.

18. The actuator of claim 17 wherein said arms have one of a rectangular or trapezoidal cross section.

19. The actuator of claim 10 wherein said arms are constructed to transmit a load from said flexure to said slider.

20. The head assembly of claim 9 wherein each of said arms comprises a plurality of horizontally stacked materials having different coefficients of thermal expansion.

21. A method of providing in plane rotary motion with a micromachined rotary actuator, comprising:

providing a central portion;

providing an outer portion at least partially surrounding said central portion and separated from said central portion by an in-plane gap;

providing a plurality of arms each connected at one end to said central portion and at another end to said outer portion so as to span said in-plane gap, said arms comprised of a plurality of horizontally stacked materials positioned to enable said arms to bend in-plane when heated; and supplying current to conductors within the rotary actuator for heating said arms.

22. The method of claim 21 additionally comprising monitoring the temperature of the rotary actuator, and wherein said supplying step is responsive to a monitored temperature.

23. The method of claim 21 additionally comprising monitoring the position of the rotary actuator, and wherein said supplying step is responsive to a monitored position.

24. The method of claim 23 wherein said arms are heated so as to obtain rotary motion in one of discrete steps or continuous motion.

25. A micromachined rotary actuator, comprising:

a central portion;

an outer portion at least partially surrounding said central portion and separated from said central portion by an in-plane gap;

a plurality of arms each connected at one end to said central portion and at another end to said outer portion so as to span said in-plane gap, each arm being comprised of a plurality of different horizontally stacked materials having different coefficients of thermal expansion positioned to enable each arm to bend in-plane when heated; and conductors for heating said arms.

26. A head assembly for a disk drive, comprising:

a micromachined rotary actuator having a stationary portion configured for connection to a flexure and a moving portion capable of providing rotary motion with respect to said stationary portion;

wherein said actuator comprises a plurality of arms each connected at one end to a central portion and at another end to an outer portion so as to span an in-plane gap, each arm being comprised of a plurality of different horizontally stacked materials having different coefficients of thermal expansion positioned to enable each arm to bend in-plane when heated;

a slider connected to said moving portion; and a transducer head carried by said slider.

* * * * *